United States Patent [19]
Fitzgerald et al.

[11] Patent Number: 6,003,294
[45] Date of Patent: Dec. 21, 1999

[54] CROP HARVESTING ROD ARRAY

[75] Inventors: Michael Brian Fitzgerald; Marty Dean Youman, both of Madera; Phillip Ray Scott, Coarse Gold; Dennis Raymond Schultz, Madera, all of Calif.

[73] Assignee: AG - Right Enterprises, Madera, Calif.

[21] Appl. No.: 09/073,664

[22] Filed: May 4, 1998

[51] Int. Cl.⁶ .......................... A01D 46/26; A01D 46/28
[52] U.S. Cl. ............................... 56/330; 56/340.1
[58] Field of Search .................. 56/330, 331, 340.1, 56/328.1, 113, 114, 126, 127

[56] References Cited

U.S. PATENT DOCUMENTS

| | | |
|---|---|---|
| 4,016,711 | 4/1977 | Claxton . |
| 4,286,426 | 9/1981 | Orlando et al. . |
| 4,621,488 | 11/1986 | Claxton . |
| 5,067,314 | 11/1991 | Burke . |
| 5,074,108 | 12/1991 | Claxton et al. . |
| 5,259,177 | 11/1993 | Windemuller et al. ................. 56/330 |
| 5,291,726 | 3/1994 | Nairn ....................................... 56/330 |
| 5,339,612 | 8/1994 | Scott . |
| 5,355,667 | 10/1994 | Scott ....................................... 56/330 |

OTHER PUBLICATIONS

American Grape Harvester, Inc Brochure –(no date).

*Primary Examiner*—Robert E. Pezzuto
*Attorney, Agent, or Firm*—Henry M. Stanley

[57] ABSTRACT

An array of foliage contacting rods having a certain stiffness and trunk contacting rods having a greater stiffness is assembled in combination for mounting on an oscillatory shaker head configured to be carried over row cultivated crops by a mobile harvester to effect crop harvesting by both foliage shaking and trunk shaking using a single shaker head. Moreover, the number of rods of each type may be varied to suit harvesting conditions while the oscillatory shaker head remains in place in the mobile harvester and the stiffness of each rod is adjustable within limits to further conform to harvesting conditions. The rod array in one embodiment provides simultaneous harvesting of multiple rows of a crop cultivated in parallel row configuration.

20 Claims, 4 Drawing Sheets

Fig_1 fig_4

CROP HARVESTING ROD ARRAY

SUMMARY OF THE INVENTION

A crop harvesting rod array is mounted on an oscillating shaker head which is carried by a mobile harvester configured to move in a direction along a crop cultivated in a row and having upper foliage and fruit portions and lower trunk portion. The mobile harvester and the carried shaker head further are configured to occupy a position which is astraddle the crop row. A rod support means is attached to and depends from the shaker head in a position adjacent opposing sides of the crop row. At least one upper crop foliage and fruit contacting rod is attached to the rod support means for positioning on each side of the opposing sides of the crop row. The upper crop contacting rod has a predetermined stiffness and extends substantially longitudinally of the mobile harvester direction of movement. At least one lower crop trunk contacting rod is attached to the rod support means for positioning on each of the opposing sides of the crop row. The lower crop trunk contacting rod has a greater stiffness than the upper crop contacting rod predetermined stiffness. The lower trunk contacting rod has a length also lying substantially longitudinally of the mobile harvester direction of movement. Thus, oscillatory contact with the foliage and fruit portions by the upper contacting rods and with the trunk portions by the lower crop trunk contacting rods provides fruit harvesting from both foliage oscillation and trunk oscillation without changing shaker head configuration.

A combination foliage and trunk contacting rod array is provided for mounting in an oscillatory shaker head which is carried by a mobile row cultivated crop harvester. The shaker head is configured to provide access to opposing sides of the upper foliage portions and the lower trunk portions within the crop row during harvesting. Harvesting rod support means is provided attached to the shaker head and disposed adjacent the opposing sides of the crop row during harvesting. At least one pair of upper foliage contacting rods is attached to the harvesting rod support means and is positioned thereon to access the opposing sides of the upper foliage portions of the crop row. The upper foliage contacting rods have a predetermined stiffness. At least one pair of lower trunk contacting rods is attached to the harvesting rod support means and is positioned thereon to access the opposing sides of the lower trunk portions of the crop row. The lower trunk contacting rods have a greater stiffness than the predetermined stiffness of the upper foliage contacting rods. As a result, oscillatory contact with the foliage and trunk portions of the crop row by the upper and lower contacting rods provides harvesting resulting from both foliage and trunk oscillation without changing shaker head configuration.

A combination foliage and trunk contacting rod array is provided for mounting in an oscillatory shaker head which is carried by a row cultivated crop harvester. Thus, access to opposing sides of upper foliage portions and lower trunk portions of a crop row is provided during harvesting of a crop cultivated in a plurality of substantially parallel crop rows. A plurality of front harvesting rod support posts are spaced laterally on, attached to and depend from a forward portion of the oscillatory shaker head. A plurality of rear harvesting rod support posts are spaced laterally on, attached to and depend from a rearward portion of the oscillatory shaker head in lateral positions corresponding to those of the plurality of front harvesting rod support posts to form a plurality of pairs of longitudinally spaced front and rear harvesting rod support posts. A plurality of upper foliage contacting rods and a plurality of lower trunk contacting rods are provided, together with means for attaching ones of the plurality of upper foliage and lower trunk contacting rods between pairs of front and rear harvesting rod support posts. As a consequence, the upper foliage and lower trunk contacting rods attached to laterally adjacent pairs of front and rear harvesting rod support posts cooperate to engage opposing sides of upper foliage portions and lower trunk portions of a crop row during harvesting.

DESCRIPTION OF THE PREFERRED EMBODIMENTS

The invention to be described herein relates to harvesting fruit from a row cultivated crop, such as a grape crop. Row crop harvesters are known wherein a tall inverted "U" shaped mobile vehicle is supported by ground contacting wheels and is either towed or driven by a contained power plant over and along the row cultivated crop. The crop, as a consequence, passes through the channel formed by the inverted "U" mobile harvester frame. Various types of shaker heads are supported within the "U" in a position to pass along each side of the row cultivated crop. The shaker heads are caused to oscillate by various means such as eccentric weight mechanisms, eccentric linkage mechanisms, etc. The oscillating shaker heads have either "beater bars" for contacting the crop foliage or crop trunk contacting rails mounted thereon. The trunk contacting rails were utilized in the shaker heads when it was perceived that too much material other than the crop material was being harvested with the crop and was therefore diminishing the quality of the harvested crop. In the case of grape crops, the material was known as "material other than grapes" or "MOG" which was thought to impart an off-flavor to the grape crop when it was reduced to juice. In the case of trunk shaking only, there was always some part of the crop that did not respond and was therefore left unharvested. Likewise, in the case of foliage shaking by the "beater bars" only, some of the crop did not respond to the harvesting effort and MOG was introduced into the harvest as well. Certain crops, it was noted, did not produced MOG even when harvested with the "beater bars." It therefore becomes clear that various crops respond in various ways to harvesting efforts and it becomes an advantage to a crop producer to be able to alter or modify the harvesting techniques by altering or modifying the harvester structure.

Figure 1:
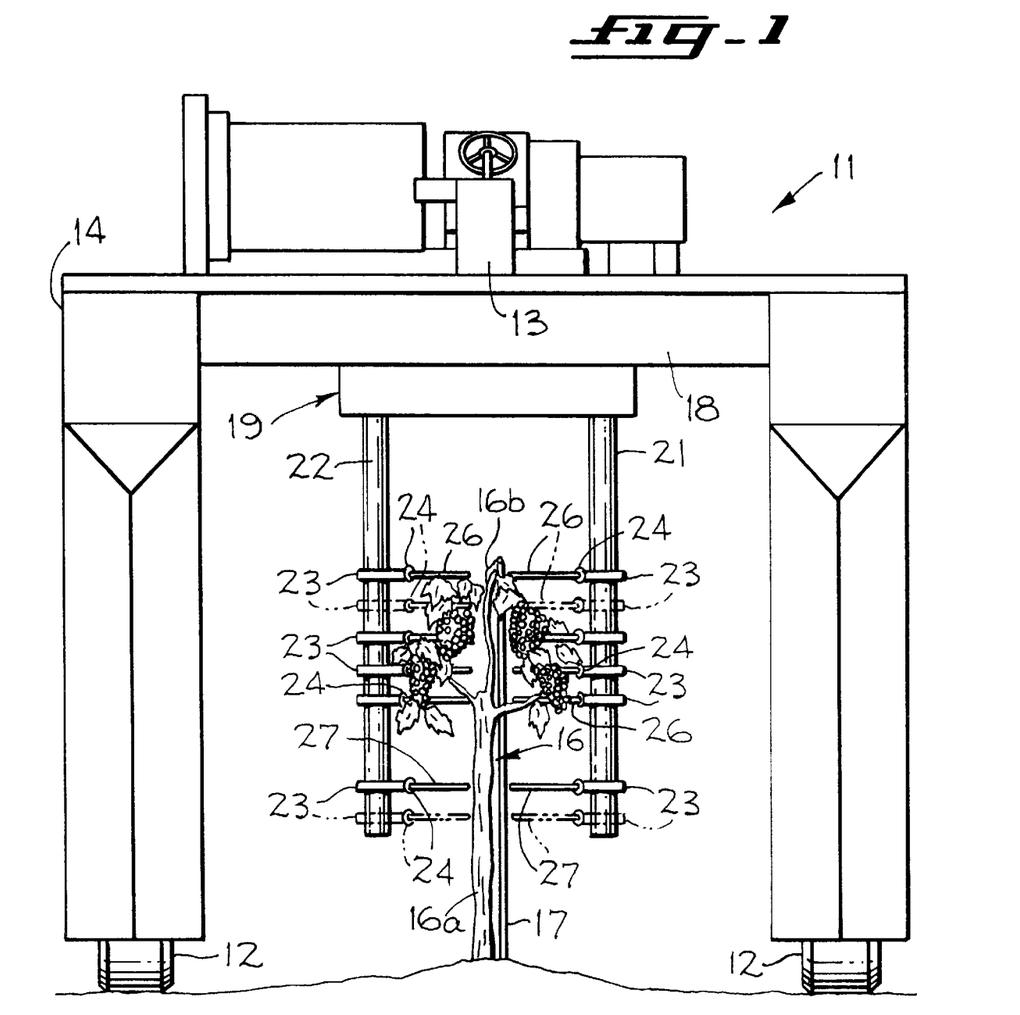
FIG. 1 is an elevation showing installation of one embodiment of the present invention in a crop row harvester.

FIG. 1 shows a front elevation of a mobile harvester 11 of the type described hereinbefore having ground support wheels 12 thereon, two of which are shown in the figure. An operator's station 13 is shown atop an inverted "U" frame 14. The mobile harvester has a contained power source (not shown) which serves to drive the harvester along the length of the row cultivated crop 16 which is supported by a series of stakes or posts 17, wires (not shown) and end posts (not shown) all of which is well-known. The power source (not shown) also drives a known vibration mechanism 18 which is generally housed within that volume of the mobile harvester overlying the crop row. A known type of shaker head 19 is shown generally in FIG. 1 adjacent to and connected to the vibration mechanism 18. Support structure for the members mounted on the shaker head 19 are attached to the shaker head and take the form of depending posts 21 and 22 in FIG. 1. Posts 21 and 22 represent two of a set of four support posts for the structure which contacts the row cultivated crop in this embodiment. Since the shaker head 19 is caused to oscillate by the vibration mechanism 18 in any one of the known manners to which reference has been made hereinbefore, support posts 21 and 22 are also caused to move in an oscillatory manner.

Attached to the front support posts 21 and 22 by means of a series of post clamps 23 and rod clamps 24 are a number of nylon rods 26, all of which will be described in greater detail hereinafter. It should be noted that additional ones of the nylon rods 26 may be added to the rod array shown in FIG. 1 as indicated in phantom line immediately below the uppermost clamp and rod assemblies mounted to posts 21 and 22. The nylon rods 26 of the preferred embodiment are about one inch in diameter and have a predetermined stiffness when shaped in the manner to be hereinafter described which facilitates crop harvesting when the rods are placed in oscillatory contact with the foliage and fruit bearing portions 16b of the row cultivated crop 16.

A number of bottom rods 27 shown in solid line and mounted to the posts 21 and 22 in FIG. 1 are also fixed to the depending posts by means of the clamp 23 and the rod clamp 24. The rods 27 of the preferred embodiment are larger in diameter than the nylon rods 26 and will be described in greater detail hereinafter. Rods 27 are also nylon material and are positioned on the depending posts 21 and 22 as seen in FIG. 1 and are low enough to contact the lower trunk portion 16a of the row cultivated crop 16 for the most part. The stiffness of the rods 27 is greater than the predetermined stiffness of the rods 26 and it has been found that good harvesting results are obtained when rods 27 are brought into oscillatory contact with the trunk portion of the row cultivated crop 16. It should also be noted as shown in phantom line in FIG. 1 that additional rods 27 may be mounted on the lower reaches of depending posts 21 and 22 for providing additional contact with the trunk portion 16a of the row cultivated crop 16. Rods 27 measuring one and one quarter inches in diameter have been found to function satisfactorily. FIG. 1 therefore shows a harvesting rod array which functions to provide oscillatory contact with the foliage and fruit bearing portions 16b of the row cultivated crop while at the same time providing oscillatory contact with the trunk portion 16a of the row cultivated crop. Further, a greater number or a fewer number of rods 26 and 27 may be included in the crop harvesting rod array according to desired harvesting techniques and to attain maximum harvesting efficiency.

Figure 2:
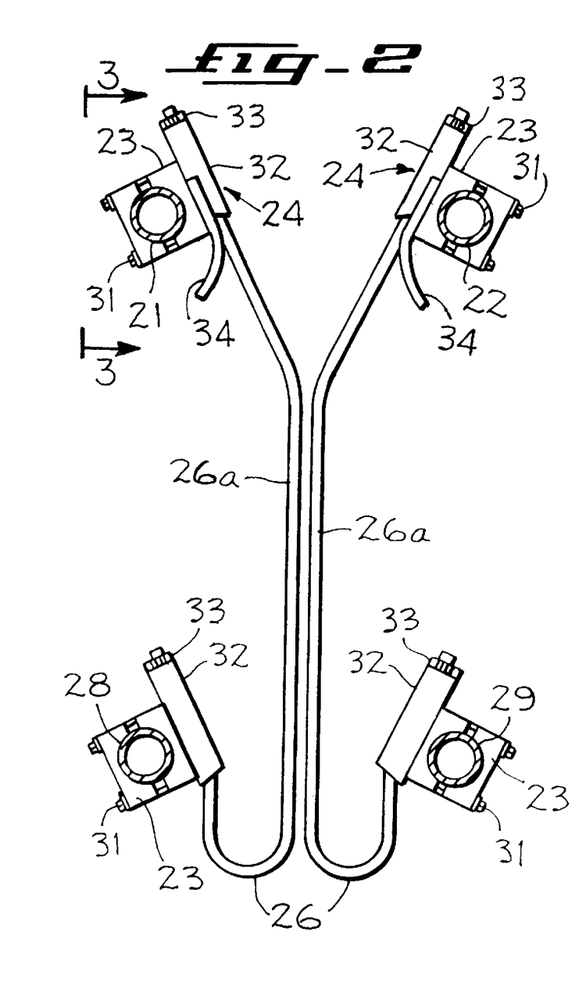
FIG. 2 is a plan view of a pair of rods used in one embodiment of the present invention.

Turning now to FIG. 2 of the drawings, the configuration of the rods 26 is shown. The shape configuration of the stiffer rods 27 is substantially the same as the rods 26. The rods are heat formed to the shape shown. FIG. 2 shows the front left and right rod support posts 21 and 22, respectively, and also shows left and right rear support posts, 28 and 29 respectively, for the rods. The post clamps 23 are seen in FIG. 2 as split clamps having fasteners 31, to be hereinafter described, to hold the clamp portions together. The post clamps 23 will also be described in greater detail hereinafter. Fixed to the inside of the post clamp 23 is the rod clamp 24 consisting in this embodiment of a rod receiving tube portion 32 and a rod clamping collar 33 (FIG. 2). While the rod clamps associated with the post clamps 23 for the left and right rear rod support posts 28 and 29 are slightly different in configuration than those associated with mounting the rods at the left and right front rod support posts 21 and 22, the component parts for both front and rear rod clamps are functionally similar and therefore carry the same item numbers.

Turning attention to the front rod receiving tubes 32 at left and right front rod support posts 21 and 22 in FIG. 2, a curved member 34 is attached to and extends rearwardly from the front rod tubes 32. The curved member 34 has a channel lying adjacent to the rod 26 and in force contact therewith. When the fasteners 31 on the clamp 23 surrounding the rod support post 21 are loosened and the clamp 23 is rotated in a counterclockwise direction as seen in FIG. 2, the channeled curved member 34 is brought into greater force contact with the rod 26, thereby providing the rod 26 with a stronger spring characteristic which resists rod lateral displacement when the straight portion 26a of the rod 26 is pushed outwardly toward the rod support post 21. The same effect can be adjusted into the rod 26 attached to right front support post 22 by adjusting the clamp 23 in a clockwise direction on the rod support post 22 as seen in FIG. 2. The straight portion 26a of the rods is typically fifty to sixty inches. Adjustment of resistance to outward displacement of the corresponding straight portions of the rods 27 is also available through adjustment of structure corresponding to that just described in conjunction with rods 26.

Figure 3:
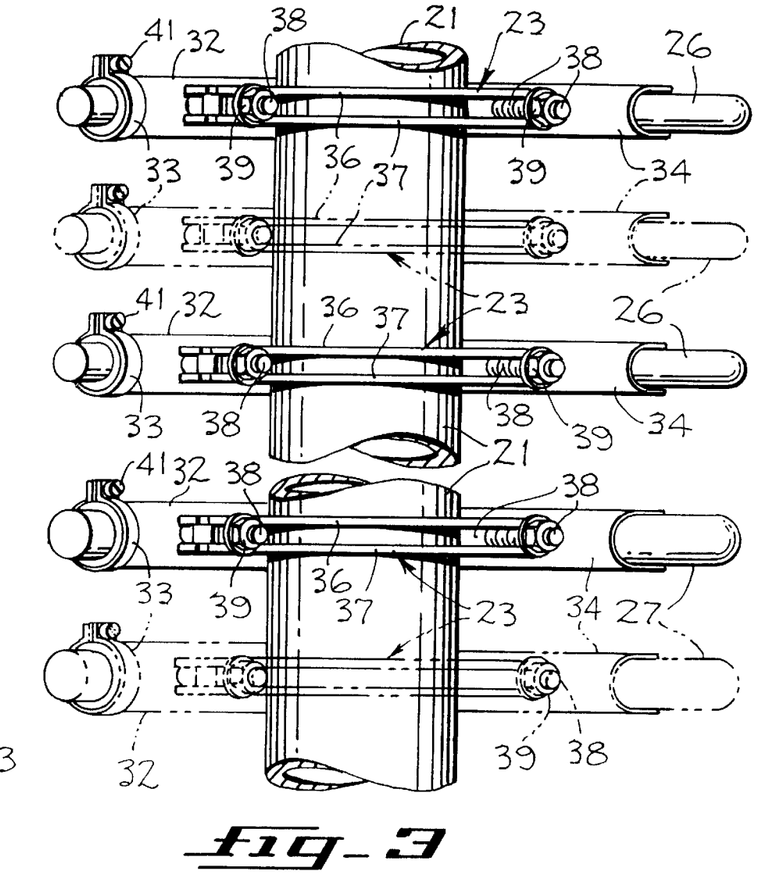
FIG. 3 is a view along the line 3—3 of FIG. 2.

With reference now to FIG. 3 of the drawings, characteristics of the post clamp 23 will be discussed. First and second flat plates 36 and 37 are formed having central circular cutouts with a radius substantially matching the outside radius of the rod support posts (item 21 in FIG. 3). The plates 36 and 37 are split along a diameter at the sides (FIG. 2) and a threaded bolt 38 is welded between the halves of the plates 36 and 37 which are adjacent to the rod tubes 32, allowing the free ends of the threaded bolts to extend therefrom. Those same halves of the plates 36 and 37 are then fixed, as by welding, to the rod tubes 32. The two halves of the plates 36 and 37 which are not adjacent to the rod tube 32 are joined at the edges and slipped over the free ends of the bolts 38 after the rod support post 21 has been engaged by the other half of the split plates 36 and 37 connected to the rod tubes. A lock nut 39 is threaded onto the free ends of the bolts 38 as seen in FIG. 3 and tightened to bring the two halves of the post clamp 23 firmly against the rod support post 21. The fasteners 31 of FIG. 2 are represented by the free ends of the threaded bolts 38 and the lock nuts 39 in the embodiment of FIG. 3.

It should be noted in FIG. 3 that the clamping mechanisms 23 and 24 as recited hereinbefore for the one inch diameter nylon rods 26 together with an additional rod 26 is depicted in phantom line to illustrate the addition or deletion of an upper foliage contacting rod at any of the depending rod support posts to modify the harvesting characteristics of the rod array. In like fashion the one and one quarter inch diameter nylon rod 27 is shown in solid line in one instance and in phantom line in another instance attached to the rod support post 21 by means of the post clamp 23 and rod clamp 24 described hereinbefore. This depiction illustrates the ability to add or delete the stiffer nylon trunk contacting rods 27 in the rod array to further tailor the harvesting characteristics of the rod array. It should further be noted in FIG. 3 that a screw 41 is shown associated with each of the rod clamping collars 33 to secure the ends of the rods 26 and 27 within the rod clamping collars 33 and the rod tubes 32 as shown.

Figure 4:
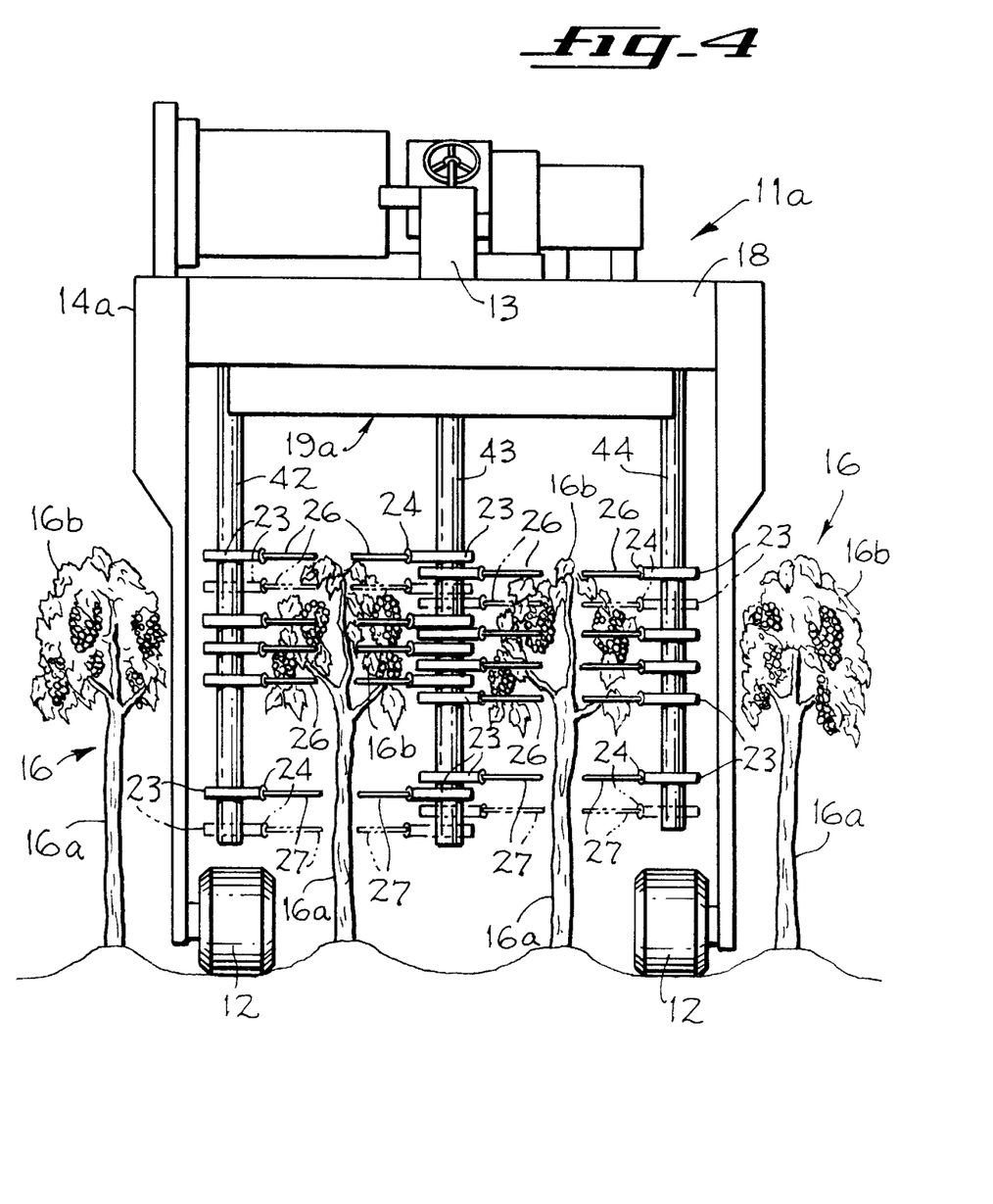
FIG. 4 is an elevation showing installation of another embodiment of the present invention in a crop row harvester.

In the front elevation shown in FIG. 4 an additional embodiment of the present invention is shown wherein the mobile harvester 11 has ground support wheels 12, the front two wheels being shown in the Figure. The operator's station is shown atop an inverted "U" shaped frame 14a which is modified to assume a width so that the harvesting rods 26 and 27 encompass two rows of a row cultivated crop 16 simultaneously. The rows of crop 16 are uniformly spaced, for example four or five feet apart, and the harvester frame 14a must be configured in a fashion to avoid adjacent rows of the crop as seen in FIG. 4. While the configuration of the frame is not part of the invention disclosed herein, it appears in FIG. 4 for illustrative purposes.

The oscillatory shaker head of FIG. 4 is shown as item 19a. Depending posts 42, 43 and 44 are attached to and extend downwardly from the front portion of shaker head 19a. Post 42 is located at the front right portion of shaker head 19a, post 43 is in the front center, and post 44 is in the front left portion of the head 19a. Posts 42 and 43 as well as posts 43 and 44 are spaced apart far enough to pass on opposing sides of two adjacent rows of crop 16. Similarly located posts extend downwardly from the rear of shaker head 19a for supporting the rear portions of rods 26 and 27 and will be shown in conjunction with the description of FIG. 5.

A number of rods 26 are attached to post 42 by means of post clamps 22 and rod clamps 24. Below the mounted rods 26, a number of rods 27 are attached to the lower portion of post 42 by post clamps 23 and rod clamps 24. The rods attached to post 42 extend inwardly toward the harvester centerline. A similar number of rods 26 and 27 are attached by post clamps and rod clamps to middle post 43 extending outwardly toward the rods attached to right front post 42. Also attached to middle post 43 by post clamps and rod clamps are a number of rods 26 and 27 which extend outwardly towards the left side of the harvester 11. Attached to left front post 44 by additional post clamps 23 and rod clamps 24 are a further number of rods 26 and 27 which extend inwardly towards the rods attached to middle post 43.

As a result a number of rods 26 engage both sides of the foliage 16b of a first row of crop 16 and a number of rods 26 engage both sides of the foliage 16b of a second adjacent row of crop 16. Additionally, a number of stiffer rods engage opposing sides of the trunks 16a of the first and adjacent second rows of crop 16. More of fewer rods 26 and 27 are mountable on posts 42, 43 and 44 as illustrated by the mounting clamps 23 and 24 and rods 26 and 27 shown in phantom lines in FIG. 4. Two adjacent rows of crop 16 are harvested simultaneously with the harvester 11 as shown in FIG. 4 utilizing rods 26 to engage foliage 16b and stiffer rods 27 to engage the trunks 16a.

It should be noted with reference to FIG. 4 that the middle depending rod supporting post 43 (as well as a rear middle post to be hereinafter introduced) is replaceable by two posts having harvester rods 26 and 27 attached as disclosed herein. The left post of the two substitute posts as viewed in FIG. 4 supports rods cooperating with the rods mounted to post 42, while the right substitute post supports rods cooperating with rods mounted on post 44. This feature may be incorporated if crop row spacing requires it.

Figure 5:
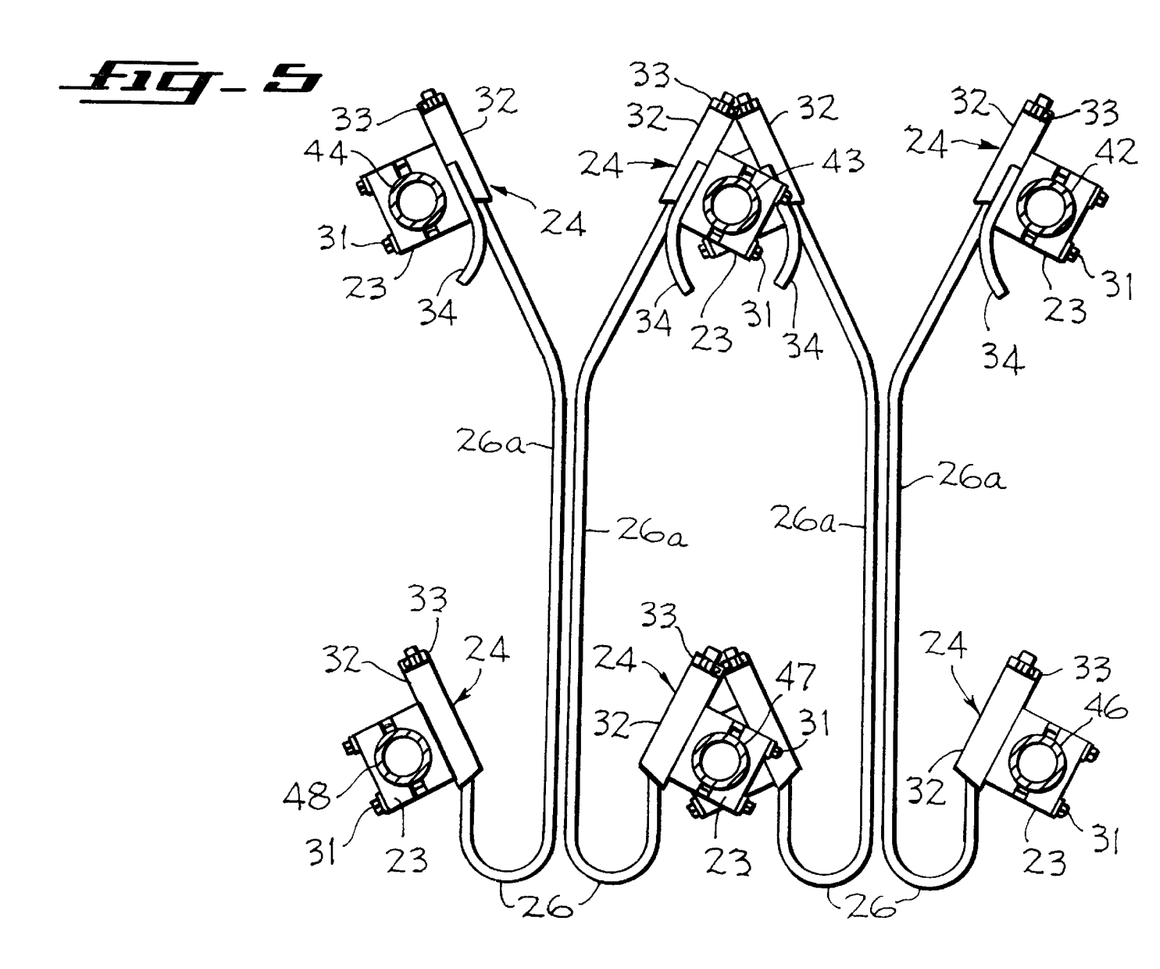
FIG. 5 is a plan view of the rod array in the embodiment of FIG. 4.

With reference now to FIG. 5, the rod array of the embodiment of FIG. 4 is shown. One level of rods 26 is shown, the configuration for stiffer rods 27 being similar. Moreover the construction of post clamps 23, rod clamps 24 and fasteners 31 having been discussed in detail in conjunction with FIG. 3, such details will not be repeated here. Four rods 26 are shown having straight portions 26a representing those portions of the rod 26 which are the primary rod contact regions with crop foliage 16b. Similar portions 27a on the stiffer rods 27 serve to provide primary contact with the trunk portions 16a.

Rods 26 are mounted at the front thereof to right front depending post 42 by means of post clamps 23 and rod clamps 24 as previously disclosed for installation on depending post 21 in conjunction with FIGS. 2 and 3. The same rods are mounted at the rear end thereof by means of the aforementioned post clamps and rod clamps to a right rear depending post 46 attached to the rear portion of oscillatory shaker head 19a. Similarly the front portions of rods 26 mounted on middle front depending post 43 are mounted at the rear by clamps 23 and 24 to a rear middle post 47. As noted hereinbefore, this embodiment includes structure wherein post 47 consists of two rear middle posts aligned with two front middle posts substituted for front middle post 43. The rods mounted between front and rear middle posts 43 and 47 extend alternately to the right and the left from the center of the harvester to cooperate with the rods mounted on depending posts 42 and 44 respectively in contacting adjacent crop rows. The rods mounted at the front to left front depending post 44 are mounted at the rear to a left rear depending post 48 by clamps 23 and 24 in the manner hereinbefore described. The channeled curved members 34 shown in FIG. 5 attached to the post clamps 23 and the rod clamps 24 are used as described in conjunction with FIG. 2 to adjust resistance to force tending to move adjacent straight portions 26a of the rods apart. In this fashion the straight portions are adjusted to exert more or less pressure against the foliage 16b of the crop 16. For example, if fasteners 31 holding post clamp 23 firmly on depending post 42 are loosened and post clamp 23 is rotated clockwise as seen in FIG. 5, a greater resistance to outward movement is imparted to the portion 26a of the rod. In similar fashion, if post clamp 23 is loosened on front post 44 and rotated clockwise on the post, the portion 26a of the corresponding rod 26 has less resistance to outward lateral movement. The stiffer rods 27 are similarly adjusted for opposing outward lateral forces exerted along similar straight portions 27a of the stiffer rods. Thus, the rod array of FIG. 5 is capable of simultaneously imparting vibratory motion from opposing sides to the foliage and the trunks of two adjacent rows of a row cultivated crop 16.

Although the best mode contemplated for carrying out the present invention has been shown and described herein, it will be understood that modification and variation may be made without departing from what is regarded to be the subject matter of the invention.

What is claimed:

1. A crop harvesting rod array mounted on an oscillating shaker head carried by a mobile harvester configured to move in a direction along a crop cultivated in a row and having upper foliage and fruit bearing portions and lower trunk portions, the mobile harvester and carried shaker head further being configured to occupy a position astraddle the crop row, comprising rod support means attached to and depending from the shaker head for positioning adjacent opposing sides of the crop row, at least one upper crop foliage and fruit contacting rod pair attached to said rod support means for positioning on each of the opposing sides of the crop row, said rod pair having a predetermined stiffness and extending substantially longitudinally of the mobile harvester direction of movement, at least one lower crop trunk contacting rod pair attached to said rod support means for positioning on each of the opposing sides of the crop row, said lower rod pair having a greater stiffness than said upper crop contacting rod pair predetermined stiffness and a length lying substantially longitudinally of the mobile harvesting direction of movement, whereby oscillatory contact with the foliage and fruit portions by said upper contacting rod and with the trunk portion by said lower crop trunk contacting rod provides fruit harvesting from both foliage oscillation and trunk oscillation without changing shaker head configuration.

2. The crop harvesting rod array of claim 1, comprising an additional lower crop trunk contacting rod pair, and means for attaching said additional lower crop trunk contacting rod pair to said rod support means adjacent said at least one lower crop trunk contacting rod pair while the carried shaker head is mounted in position on the mobile harvester.

3. The crop harvesting rod array of claim 1, wherein said rod support means comprises right front and right rear depending posts, and left front and left rear depending posts, said at least one upper crop foliage and fruit contacting pair comprising a plurality of upper crop foliage and fruit contacting rods, means for attaching ones of said plurality of upper crop foliage and fruit contacting rods between said right front and right rear depending posts and other ones thereof between said left front and left rear depending posts, said at least one lower crop trunk contacting pair comprising a plurality of lower crop trunk contacting rods, and means for attaching ones of said plurality of lower crop trunk contacting rods between said right front and right rear depending posts and other ones thereof between said left front and left rear depending posts.

4. The crop harvesting rod array of claim 1, wherein said rod support means comprises right front and left front depending posts, further comprising means for attaching said at least one upper crop foliage and fruit contacting rod pair to said right and left front depending posts for positioning on opposing sides of the crop row, a stiffening member extending from said means for attaching and being disposed for adjustable force contact with said contacting rod so that increased force contact between said stiffening member and ones of said upper crop foliage and fruit contacting rod pair enhances said predetermined stiffness.

5. The crop harvesting rod array of claim 1, wherein said rod support means comprises right front and left front depending posts, further comprising means for attaching said at least one lower crop trunk contacting rod pair to said right and left front depending posts for positioning on opposing sides of the crop row, a stiffening member fixed to and extending from said means for attaching, said stiffening member being disposed for adjustable force contact with said contacting rod so that increased force contact between said stiffening member and ones of said lower crop trunk contacting rod enhances said greater stiffness.

6. The crop harvesting rod array of claim 1, comprising an additional upper crop foliage and fruit contacting rod pair, and means for attaching said additional upper crop foliage and fruit contacting rod pair to said rod support means adjacent said at least one upper foliage and fruit contacting rod pair so that said upper contacting rods are installable and removable while the carried shaker head is mounted in position on the mobile harvester.

7. The crop harvesting rod array of claim 3 wherein the crop is cultivated in a plurality of substantially parallel rows, said rod support means further comprising middle front and rear depending posts, means for attaching ones of said plurality of upper crop foliage and fruit contacting rods between said middle front and rear depending posts, and means for attaching ones of said plurality of lower crop trunk contacting rods between said middle front and rear depending posts, so that upper crop foliage and fruit contacting rods and lower crop trunk contacting rods attached between right front and rear depending posts, middle front and rear depending posts and left front and rear depending posts cooperate to contact opposing sides of two adjacent substantially parallel crop rows.

8. A combination foliage and trunk contacting rod array for mounting in an oscillatory shaker head carried by a mobile row cultivated crop harvester to provide access to opposing sides of upper foliage portions and lower trunk portions within a crop row during harvesting, comprising harvesting rod support means attached to the shaker head positioned to be disposed adjacent the opposing sides of the crop row during harvesting, at least one pair of upper foliage contacting rods attached to said harvesting rod support means positioned thereon to access the opposing sides of the upper foilage portions of the crop row, said upper foliage contacting rods having a predetermined stiffness, at least one pair of lower trunk contacting rods attached to said harvesting rod support means positioned thereon to access the opposing sides of the lower trunk portions of the crop row, said lower trunk contacting rods having a greater stiffness than said predetermined stiffness, whereby oscillatory contact with the foliage and trunk portions of the crop row by said upper and lower contacting rods provides harvesting resulting from both foliage and trunk oscillation without changing shaker head configuration.

9. The combination foliage and trunk contacting rod array as in claim 8, together with additional upper foliage contacting rods, and means for attaching said additional upper foliage contacting rods to said harvesting rod support means in positions adjacent said at least one pair of upper foliage contacting rods so that said upper foliage contacting rods are installable and removable while the carried oscillatory shaker head is mounted in position on the mobile crop harvester.

10. The combination foliage and trunk contacting rod array as in claim 8, together with additional lower trunk contacting rods, and means for attaching said additional lower trunk contacting rods to said harvesting rod support means in positions adjacent said at least one pair of lower trunk contacting rods so that said lower trunk contacting rods are installable and removable while the carried oscillatory shaker head is mounted in position on the mobile crop harvester.

11. The combination foliage and trunk contacting rod array of claim 8, wherein said harvesting rod support means comprises right front and right rear depending posts, and left front and left rear depending posts, said at least one pair of upper foliage contacting rods comprising a plurality of upper foliage contacting rods, means for attaching ones of said plurality of upper foliage contacting rods between said right front and right rear depending posts and other ones thereof between said left front and left rear depending posts, said at least one pair of lower trunk contacting rods comprising a plurality of lower trunk contracting rods, and means for attaching ones of said plurality of lower trunk contacting rods between said right front and right rear depending posts and other ones thereof between said left front and left rear depending posts.

12. The combination foliage and trunk contacting rod array of claim 8, wherein said harvesting rod support means comprises right front depending posts, and left front depending posts, further comprising means for attaching said at least one pair of upper foliage contacting rods to said right and left front depending posts for positioning on opposing sides of the row cultivated crop, and an adjustable stiffening member extending from said means for attaching being disposed adjacent to and in adjustable force contact with said at least one pair of upper foliage contacting rods so that adjusted force contact between said stiffening member and said at least one pair of upper foliage contacting rods provides adjustment of said predetermined stiffness.

13. The combination foliage and trunk contacting rod array of claim 8, wherein said harvesting rod support means comprises right front depending posts, and left front depending posts, further comprising means for attaching said at least one pair of lower trunk contacting rods to said right and left front depending posts for positioning on opposing sides of the row cultivated crop, and an adjustable stiffening member extending from said means for attaching being disposed adjacent to and in adjustable force contact with said at least one pair of lower trunk contacting rods so that adjusted force contact between said stiffening member and said at least one pair of lower trunk contacting rods provides adjustment of said greater stiffness.

14. The combination foliage and trunk contacting rod array of claim 11 wherein the crop is cultivated in a plurality of substantially parallel crop rows, said harvesting rod support means further comprising centrally disposed front and rear depending posts, means for attaching ones of said plurality of upper foliage and said plurality of lower trunk contacting rods between said centrally disposed front and rear depending posts in positions to cooperate with ones of said plurality of upper foliage and said lower trunk contacting rods attached to said right front and rear and said left front and rear depending posts, whereby said upper crop foliage and said lower crop trunk contacting rods contact crop foliage and trunk portions respectively in adjacent substantially parallel crop rows.

15. A combination foliage and trunk contacting rod array for mounting in an oscillatory shaker head carried by a mobile row cultivated crop harvester to provide access during harvesting to opposing sides of upper foliage portions and lower trunk portions of a row of a crop cultivated in a plurality of substantially parallel crop rows, comprising a plurality of front harvesting rod support posts spaced laterally on, attached to and depending from a forward portion of the oscillatory shaker head, a plurality of rear harvester rod support posts spaced laterally on, attached to and depending from a rearward portion of the oscillatory shaker head in lateral positions corresponding to those of said plurality of front harvesting rod support posts to form a plurality of pairs of front and rear harvesting rod support posts, a plurality of upper foliage contacting rods, a plurality of lower trunk contacting rods, means for attaching ones of said plurality of upper foliage contacting rods and lower trunk contacting rods between ones of said plurality of pairs of front and rear harvesting rod support posts so that said upper foliage and lower trunk contacting rods attached to laterally adjacent pairs of front and rear harvesting rod support posts cooperate to engage opposing sides of upper foliage portions and lower trunk portions of a crop row during harvesting.

16. The combination foliage and trunk contacting rod array of claim 15, comprising additional upper foliage contacting rods, and means for attaching said additional upper foliage contacting rods to ones of said plurality of pairs of front and rear harvesting support posts, whereby installation and removal of upper foliage contacting rods is achieved while the oscillatory shaker head is mounted is mounted in the crop harvester.

17. The combination foliage and trunk contacting rod array of claim 15, comprising additional lower trunk contacting rods, and means for attaching said additional lower trunk contacting rods to ones of said of pairs of front and rear harvesting rod support posts, whereby installation and removal of lower trunk contacting rods is achievable while the oscillatory shaker head is mounted in the mobile crop harvester.

18. The combination foliage and trunk contacting rod array of claim 15, comprising adjustable stiffening means on said means for attaching, said stiffening means being in adjustable force contact with said plurality of upper foliage contacting rods and lower trunk contacting rods, whereby adjustment of force contact between said adjustable stiffening means and said plurality of upper foliage contacting rods and lower trunk contacting rods provides adjustable stiffness in said contacting rods.

19. The combination foliage and trunk contacting rod array of claim 15, wherein said plurality of upper foliage contacting rods have a predetermined stiffness, and wherein said plurality of lower trunk contacting rods have a greater to stiffness than said predetermined stiffness.

20. The combination foliage and trunk contacting rod array of claim 15, wherein the row of a crop consists of at least two rows of a crop, and wherein said upper foliage and lower trunk contacting rods attached to laterally adjacent pairs of front and rear harvesting rod support posts cooperate to engage opposing sides of upper foliage portions and lower trunk portions of at least two adjacent substantially parallel crop rows during harvesting.

* * * * *